United States Patent
Bernzen et al.

(10) Patent No.: US 9,415,752 B2
(45) Date of Patent: Aug. 16, 2016

(54) MOTOR VEHICLE HAVING A DRIVER ASSISTANCE UNIT

(75) Inventors: Werner Bernzen, Ehningen (DE); Hikmet Parca, Stuttgart (DE); Dominic Reutter, Notzingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/127,077

(22) PCT Filed: Jun. 14, 2012

(86) PCT No.: PCT/EP2012/002501
§ 371 (c)(1),
(2), (4) Date: Dec. 17, 2013

(87) PCT Pub. No.: WO2012/175176
PCT Pub. Date: Dec. 27, 2012

(65) Prior Publication Data
US 2014/0142830 A1    May 22, 2014

(30) Foreign Application Priority Data
Jun. 18, 2011 (DE) .......................... 10 2011 104 925

(51) Int. Cl.
*B60T 7/12* (2006.01)
*B60T 7/22* (2006.01)
*B60T 8/1755* (2006.01)
*G08G 1/16* (2006.01)

(52) U.S. Cl.
CPC ... *B60T 7/12* (2013.01); *B60T 7/22* (2013.01); *B60T 8/17558* (2013.01); *G08G 1/16* (2013.01)

(58) Field of Classification Search
None
See application file for complete search history.

(56) References Cited

U.S. PATENT DOCUMENTS

| | | | |
|---|---|---|---|
| 5,278,764 A * | 1/1994 | Iizuka et al. .................. | 701/301 |
| 6,260,880 B1 * | 7/2001 | Hada et al. ..................... | 180/268 |
| 2002/0128795 A1 * | 9/2002 | Schiffmann ............ | B60T 8/172 702/151 |
| 2006/0052924 A1 * | 3/2006 | Prakah-Asante ... | B60R 21/0134 701/45 |
| 2007/0228705 A1 * | 10/2007 | Rao et al. ...................... | 280/735 |
| 2009/0164063 A1 * | 6/2009 | Piccinini ............... | B60W 10/06 701/45 |
| 2009/0210114 A1 * | 8/2009 | Baumann et al. ............... | 701/45 |
| 2011/0044507 A1 | 2/2011 | Strauss et al. | |

FOREIGN PATENT DOCUMENTS

| | | |
|---|---|---|
| DE | 101 02 772 A1 | 7/2002 |
| DE | 10 2005 062 274 A1 | 6/2007 |
| DE | 10 2008 048 436 A1 | 3/2010 |

(Continued)

OTHER PUBLICATIONS

International Search Report dated Apr. 29, 2013 w/ English translation (six (6) pages).

(Continued)

*Primary Examiner* — Rami Khatib
*Assistant Examiner* — David Merlino
(74) *Attorney, Agent, or Firm* — Crowell & Moring LLP

(57) ABSTRACT

A motor vehicle has a driver assistance unit that includes a braking unit and at least one detection unit to detect an environmental parameter. The driver assistance unit can control performance of an autonomous deceleration of the motor vehicle in the case of a risk of collision, which is recognized using the environmental parameter. The driver assistance unit is formed in such a way that an autonomous emergency stop is only then able to be carried out if the motor vehicle has at least one reversible seat belt pre-tensioner.

5 Claims, 1 Drawing Sheet

(56) References Cited

FOREIGN PATENT DOCUMENTS

| | | |
|---|---|---|
| DE | 10 2008 059 695 A1 | 6/2010 |
| DE | 10 2009 012 735 A1 | 9/2010 |
| DE | 10 2009 020 649 A1 | 11/2010 |
| DE | 10 2010 019 291 A1 | 1/2011 |
| DE | 10 2009 029 388 A1 | 3/2011 |
| EP | 1 428 728 A2 | 6/2004 |
| EP | 2 284 047 A1 | 2/2011 |
| JP | 2004-203387 A | 7/2004 |
| JP | 2008-149900 A | 7/2008 |
| WO | WO 2009/103692 A1 | 8/2009 |

OTHER PUBLICATIONS

German-language Written Opinion dated Apr. 29, 2013 (seven (7) pages).

Japanese Office Action dated Jan. 20, 2015, including partial English translation (five (5) pages).

* cited by examiner

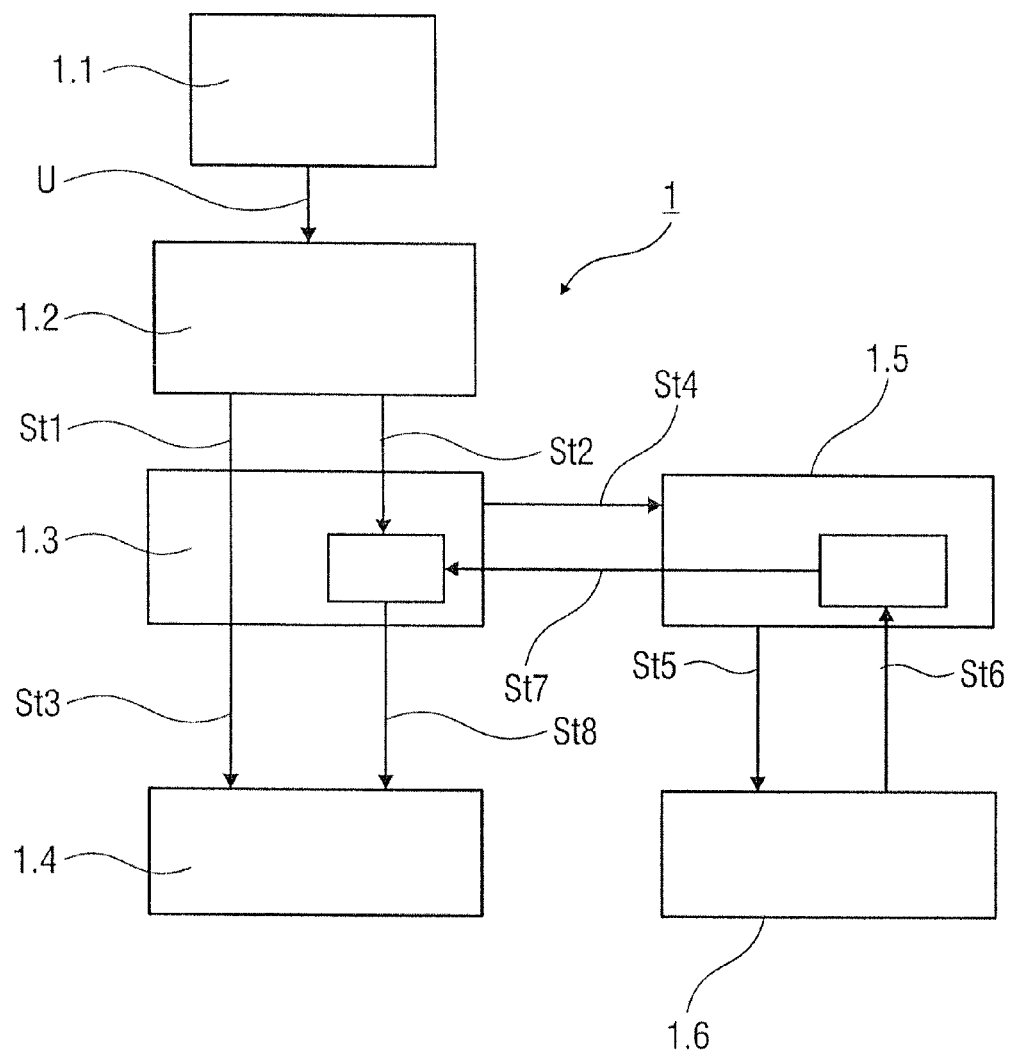

MOTOR VEHICLE HAVING A DRIVER ASSISTANCE UNIT

BACKGROUND AND SUMMARY OF THE INVENTION

Exemplary embodiments of the present invention relate to a motor vehicle having a driver assistance unit and a method to operate a driver assistance unit.

Known methods for operating driver assistance units employ suitable detection units to detect environmental parameters that contain information about the surrounding environment of the motor vehicle. Thus, for example, obstacles in a road can be detected. To avoid a collision, the detected environmental parameters are compared with current driving parameters, such as, for example, a yaw angle of the motor vehicle and/or a motor vehicle speed, in order to assess the risk of collision. If a risk of collision exists for the motor vehicle, then a deceleration of the motor vehicle is autonomously triggered by the driver assistance unit, in order to avoid a crash of the motor vehicle or at least to decrease the severity of the crash.

German patent document DE 10 2009 020 649 A1 discloses a method and device to avoid collision for a motor vehicle in which deviation trajectories are calculated in the case of a threatening collision, which are applied to interval limits. When the interval limits are achieved, a warning is displayed for the driver and a deviation maneuver is initiated.

Furthermore German patent document DE 101 02 772 A1 discloses a device and a method for adaptive driving speed regulation of a motor vehicle in which automatic steering interventions and/or braking can be carried out depending on a recognized dangerous situation, in order to reduce the risk of collisions of the motor vehicle.

Exemplary embodiments of the present invention are directed to an improved motor vehicle having a driver assistance unit and an improved method for the operation of a driver assistance unit.

A motor vehicle has a driver assistance unit, which comprises at least one detection unit to detect an environmental parameter and a brake unit. The driver assistance unit is formed in such a way that an autonomous deceleration of the motor vehicle is able to be carried out in the case of risk of collision, recognized by means of the environmental parameter. According to the invention, the driver assistance unit is formed in such a way that an autonomous emergency stop is only then able to be carried out if the motor vehicle has at least one reversible seat belt pre-tensioner.

The driver assistance system is able to brake the motor vehicle autonomously. An autonomously initiated deceleration can, however, catch a vehicle driver or a vehicle passenger unprepared and be initiated at an inappropriate moment, in which a sitting position of the vehicle driver or of the vehicle passenger is not optimally adjusted to a collision situation. Moreover, an upper body of the vehicle driver or of the vehicle passenger is typically shifted forwards during the braking process due to the inertia, before this forward movement can be stopped by a seat belt. Through the upper body being shifted forwards during the autonomously initiated deceleration, however, an increased risk of injury for the vehicle passenger or vehicle driver results in the case of collision, as the upper body protrudes into a region of an inflatable air bag. Injuries through the inflation of the air bag cannot occur. Additionally, through the forward inclination of the upper body, an increased load, in particular in the throat and neck region, results if the upper body of the vehicle driver or the vehicle passenger collides with the inflated air bag. In order to reduce this increased risk of injury, the maximum deceleration of the motor vehicle is limited to a maximum amount in the case of the autonomously initiated deceleration. The driver assistance unit is constructed such that an emergency stop of the motor vehicle, in the case of which a deceleration force acting on the motor vehicle is limited by the design of the braking unit of the motor vehicle, is only then possible if the motor vehicle has a reversible seat belt pre-tensioner. Therein the reversible seat belt pre-tensioner is controllable in such a way that the sitting position of the vehicle driver and/or the vehicle passenger can already be fixed before the initiation of the autonomous deceleration by means of the safety belt being tightened, such that the risk of injury in the case of an accident of the motor vehicle is reduced.

In a method to operate a driver assistance unit for a motor vehicle, a risk of collision is recognized by means of at least one detected environmental parameter. In the case of a recognized risk of collision, an autonomous deceleration of the motor vehicle is triggered. According to the invention, depending on the autonomous deceleration to be triggered, an activity of a drive unit of a reversible seat belt pre-tensioner is examined. The autonomous deceleration of the motor vehicle is limited to a maximum amount, which lies below a maximum magnitude of the deceleration of the motor vehicle by design, if the examination of the activity of the passenger protection unit gives a negative result. If the examination of the drive unit of the seat belt pre-tensioner gives a positive result, then the maximum deceleration of the motor vehicle is not limited and an autonomous emergency stop of the motor vehicle is initiated in the case of actual dangerous conditions.

The limiting of the deceleration of the motor vehicle, initiated autonomously by the driver assistance unit, to a maximum amount should reduce an undesired and potentially dangerous forward inclination of a vehicle passenger due to mass inertia. Therein, in particular, the posture of the vehicle passenger is decisive at the time of the collision, in which an air bag of the passenger protection unit is triggered and inflated. If, at the time of the collision, the upper body of the vehicle passenger is inclined too far forwards, there exists an increased risk of injury for the vehicle passenger during the inflation of the air bag. In particular, in the case of forward inclination, a neck region of the vehicle passenger is exposed to an increased load, which does not occur, if, fundamentally, the body of the vehicle passenger is fixed in a regular sitting position at the time of the collision.

In the case of a recognized risk of collision, a deceleration of the motor vehicle is autonomously initiated. If the amount of the initiated deceleration, so the amount of a negative accelerating force which is to act on a motor vehicle, exceeds the predetermined maximum amount, then it is queried whether a passenger protection unit, suited to fixing the sitting position is activated and/or functional. In particular, the passenger protection unit can comprise a reversible seat belt pre-tensioner. If the passenger protection unit is activated and functional, then the restriction of the autonomous deceleration to the maximum amount is overridden, as it can be assumed that the vehicle passenger is fixed in a secure sitting position. Thus, an autonomous emergency stop can be initiated, in the case of which the accelerating forces acting on the motor vehicle are only limited by the design. If the passenger protection unit is not functional or is deactivated, then the examination of the same gives a negative result. Correspondingly, the autonomously initiated deceleration of the motor vehicle is limited to an amount below the maximum amount, in order to avoid a higher risk of injury of the vehicle passenger.

BRIEF DESCRIPTION OF THE DRAWING FIGURE

The invention will be illustrated in more detail below by means of a FIGURE.

FIG. 1 schematic view of the design of the method to operate a driver assistance unit in a block diagram.

DETAILED DESCRIPTION

FIG. 1 schematically illustrates a method for operating a driver assistance unit 1 for a motor vehicle. A detection unit 1.1, which comprises in particular a radar sensor, a LIDAR sensor and/or an optical camera unit, detects at least one environmental parameter U of the environment of the motor vehicle. Therein, for example, distances and relative speeds of potential obstacles are detected, which are located on or close to an extrapolated vehicle trajectory of the motor vehicle.

The environmental parameter U is supplied to a first control unit 1.2 of the detection unit 1.1 for evaluation. The first control unit 1.2 preferably comprises at least one graphics processor to evaluate the environmental parameter U. If an evaluation of the environmental parameter U gives a critical risk of collisions of the motor vehicle, then a corresponding first control signal St1 or a second control signal St2 is transmitted to a second control unit 1.3 of a braking unit 1.4 of the motor vehicle.

In a preferred embodiment of the invention, a warning signal, which is perceptible to a vehicle driver, is emitted to reduce the risk of collision, such that the vehicle driver is prompted to react adequately to the present dangerous situation. The emitted warning signal can be implemented as an optical, audible or haptic warning signal. The optical warning signal, for example, can be displayed on the inside of the car on a dashboard of the motor vehicle and in the field of vision of the vehicle driver. Likewise, the haptic warning signal can be implemented by vibrating the steering wheel. Only if a reaction of the vehicle driver to the altered dangerous situation does not occur is the first or second control signal St1, St2 transmitted to the second control unit 1.3 to initiate an autonomous deceleration of the motor vehicle.

The second control unit 1.3 is preferably part of an existing adaptive driver assistance system (e. g. of an electronic stability control), which monitors and, if necessary, corrects the braking of the motor vehicle by means of suitable electronic routines in order to, for example, prevent the motor vehicle from skidding or the wheels of the motor vehicle from locking.

The first or second control signal St1 initiates an autonomous braking of the motor vehicle. Depending on the acute dangerous situation, deceleration of varying magnitudes can be initiated. Thus, in the case of few critical situations, a partial braking is initiated by the first control signal St1, in which case an amount of deceleration of the motor vehicle remains under a predetermined maximum value. This additionally gives the vehicle driver a chance to react to the dangerous situation. The partial braking, triggered by the first control signal St1, is implemented immediately. A corresponding third control signal St3 is additionally directed to the braking unit 1.4.

If an acute dangerous situation exists or if an adequate reaction of the vehicle driver to the dangerous situation does not occur, the second control signal St2 is transmitted to the second control unit 1.3. Thus, an emergency stop of the motor vehicle is initiated, in which the deceleration of the motor vehicle lies above the predetermined maximum value. Therein forces act on the upper body of the vehicle passengers and/or the vehicle driver due to mass inertia, such that a dangerous forward inclination occurs in the direction of travel, before the forward movement of the respective upper body is stopped and held by a safety belt.

This forward inclination of the upper body leads to an increased risk of injury in the case of collision of the vehicle. In particular, overloading can occur in the throat and neck region if an air bag is triggered. In order to reduce this risk of injury, an active and reversible seat belt pre-tensioner is activated before the braking, which fixes the vehicle passenger or the vehicle driver in a regular sitting position, in which case, in particular, the upper body, fundamentally, fits closely to a backrest of a vehicle seat.

The passenger protection unit, however, could, for example, not be functional due to a defect of the seat belt pre-tensioner. This could be the case, for example, due to a undervoltage in the electrical system, due to a mechanical defect in a drive unit 1.6 of the seat belt pre-tensioner, due to an electronic defect in a third control unit 1.5 of the passenger protection unit or due to a communication error in an interface.

Thus, a query is sent by the second control unit 1.3 in the case of reception of the second control signal St2, in order to examine the activity of the seat belt pre-tensioner. To that end, a fourth control signal St4 is transmitted to the third control unit 1.5 of the passenger protection system, which sends a query to the drive unit 1.6 of the corresponding passenger protection unit and, in particular, of the reversible seat belt pre-tensioner in the form of a fifth control signal St5.

A safety belt can be tightened, in particular pneumatically or electromotively, by means of the drive unit 1.6 of the passenger protection unit, such that a forward movement of the upper body of the vehicle passenger during the deceleration of the motor vehicle can largely be avoided. The drive unit 1.6 enables a reversible tightening of the safety belt. To initiate the tightening of the seat belt, mechanical springs or spring assemblies of the drive unit, for example, can also be activated.

For example, the activity of the seat belt pre-tensioner can be examined by querying a corresponding motor speed, power consumption or axial rotation of the drive unit 1.6. A corresponding sixth control signal St6 is directed to the third control unit 1.5 by the drive unit 1.6. The activity of the passenger protection device is detected by means of an analysis of the sixth control signal St6.

If the seat belt pre-tensioner is activated, then it is assumed that the vehicle passenger(s) is/are securely fixed in their respective sitting positions and a dangerous forward inclination in the case of the emergency stop can be eliminated. A seventh control signal St7 is then transmitted to the second control unit 1.3 of the braking unit 1.4. The second control unit 1.3 initiates an autonomous emergency stop by means of an eighth control signal St8, directed towards the braking unit 1.4, in which case the maximum deceleration of the motor vehicle is only limited by the design and not by the predetermined maximum value.

If, however, it is determined by the third control unit 1.5 that the drive unit 1.6 of the seat belt pre-tensioner does not function or does not function properly, then no autonomous deceleration is triggered due to the increased risk of injury of the vehicle driver and/or the vehicle passenger. A maximum deceleration of the braking of the motor vehicle, triggered by the third control unit 1.3, remains restricted by the predetermined maximum value.

This method to operate the driver assistance unit reduces the risk of injury of vehicle passengers in the case of a collision and/or an emergency stop of the motor vehicle. In particular, a seat belt pre-tensioner is examined for activity or functionality before an emergency stop, initiated autonomously by the driver assistance unit, by the method described here. Such seat belt pre-tensioners typically have a maximum mechanical life cycle, after the expiry of which, the function of the seat belt pre-tensioner is electronically blocked. Thus, it is advantageous to examine the activity of the passenger protection unit or of the seat belt pre-tensioner before an emergency stop, in order to minimize a possible risk of injury of the vehicle passenger.

The described "reversible seat belt pre-tensioner" causes a "reversible tightening of the seat belt". Generally, the reversible tightening of the seat belt could also be implemented by an active seat belt buckle or another component. The function is paramount, and not a component. The query of the presence of a "reversible seat belt pre-tensioner" is correspondingly to be understood as a query of the presence of a component, which fulfils the function of reversibly tightening the seat belt.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A motor vehicle driver assistance unit, comprising:
   at least one detection unit configured to detect an environmental parameter;
   wherein the driver assistance unit is configured to perform an autonomous deceleration of the motor vehicle when a risk of collision is identified using the environmental parameter, and
   wherein the driver assistance unit is configured to examine activity of a drive unit of a reversible seat belt pre-tensioner so that an autonomous emergency stop is performed only if the reversible seat belt pre-tensioner is functional and so that an autonomous emergency stop is suppressed if the reversible seat belt pre-tensioner is not functional.

2. A method for operating a driver assistance unit for a motor vehicle, the method comprising:
   detecting, by a detection unit, a risk of collision using at least one detected environmental parameter;
   triggering an autonomous deceleration of the motor vehicle if the risk of collision is detected,
   wherein depending on the autonomous deceleration to be triggered, an activity of a drive unit of a reversible seat belt pre-tensioner is examined and an autonomous emergency stop of the motor vehicle is only then carried out if the examination of the activity of the drive unit indicates the reversible seat belt pre-tensioner is operational and an autonomous emergency stop of the motor vehicle is suppressed if the examination of the activity of the drive unit indicates the reversible seat belt pre-tensioner is not functional.

3. The method according to claim 2, wherein the activity of the drive unit is only examined if an amount of the deceleration of the motor vehicle to be triggered is higher than a predetermined maximum amount.

4. The method according to claim 2, wherein a warning is emitted to a vehicle driver before the triggering.

5. The method according to claim 4, wherein the warning to the vehicle driver is emitted as an optical, audible or haptic warning signal.

* * * * *